US007230934B2

(12) United States Patent
Choi (10) Patent No.: US 7,230,934 B2
(45) Date of Patent: Jun. 12, 2007

(54) COMBINATORIAL MOBILE IP SYSTEM AND METHOD OF MANAGING MOBILITY USING THE SAME

(75) Inventor: Tae Hwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 10/303,837

(22) Filed: Nov. 26, 2002

(65) Prior Publication Data

US 2004/0198383 A1 Oct. 7, 2004

(30) Foreign Application Priority Data

Jun. 29, 2002 (KR) ...................... 10-2002-0037429

(51) Int. Cl.
*H04Q 7/00* (2006.01)
*H04L 12/66* (2006.01)
(52) U.S. Cl. ........................ 370/313; 370/349; 370/352
(58) Field of Classification Search ................ 370/401, 370/409, 450, 453–454, 459
See application file for complete search history.

(56) References Cited

U.S. PATENT DOCUMENTS

| 6,400,722 | B1 * | 6/2002 | Chuah et al. ................ 370/401 |
| 6,445,922 | B1 * | 9/2002 | Hiller et al. ................. 455/433 |
| 6,584,098 | B1 * | 6/2003 | Dutnall ........................ 370/354 |
| 6,707,809 | B1 * | 3/2004 | Warrier et al. ............... 370/351 |
| 6,711,147 | B1 * | 3/2004 | Barnes et al. ................ 370/338 |
| 6,721,291 | B1 * | 4/2004 | Bergenwall et al. ......... 370/331 |
| 6,731,621 | B1 * | 5/2004 | Mizutani et al. ............. 370/338 |
| 6,980,801 | B1 * | 12/2005 | Soininen et al. .......... 455/435.1 |
| 6,992,995 | B2 * | 1/2006 | Agrawal et al. ............. 370/328 |
| 2002/0118674 | A1 * | 8/2002 | Faccin et al. ................ 370/352 |
| 2003/0108014 | A1 * | 6/2003 | Newberg et al. ............ 370/338 |
| 2003/0140131 | A1 * | 7/2003 | Chandrashekhar et al. . 709/223 |

FOREIGN PATENT DOCUMENTS

JP 11-252182 9/1999

OTHER PUBLICATIONS

Campbell, Andrew T., et al.; "Design, Implementation, and Evaluation of Cellular IP," IEEE Personal Communications, Aug. 2000, pp. 42-49.
Office Action issued by the Patent Office of the People's Republic of China dated Jun. 24, 2005.
Japanese Office Action dated Jun. 30, 2005 in Japanese Application No. 2002-382364.

(Continued)

*Primary Examiner*—Doris H. To
*Assistant Examiner*—Soon D. Hyun
(74) *Attorney, Agent, or Firm*—Ked & Associates, LLP (57) ABSTRACT

A combinatorial system and method manages the location and/or movement of mobile IP terminals using the dual approach of minimized paging and registration. The system includes a home agent having a main server for performing reciprocal communications with a mobile node, and a foreign agent which relays reciprocal communications between the mobile and home agents. The foreign agent is included within at least one regional area and is constructed with at least one controlling foreign agent which communicates with the home agent reciprocally and at least one paging foreign agent which communicates reciprocally with the controlling foreign agent.

30 Claims, 7 Drawing Sheets

OTHER PUBLICATIONS

Campbell et al., Design, Implementation, and Evaluation of Cellular IP, IEEE Personal Communications, Aug. 2000.

"Mobile IP Regional Registration", Eva Gustafsson et al., Nokia Research Center, pp. 1-27, Mar. 2000.

"Mobile IP Regional Paging", H. Haverinen et al., Nokia, pp. 1-16, Jun. 2000.

Design. Implementation, and Evaluation of Cellular IP, Andrew T. Campbell et al., *IEEE Personal Communications*, pp. 42-49, Aug. 2000.

"Cellular IP", A. Campbell et al., Ericsson, Columbia University, pp. 1-19, Nov. 1998.

"IP Mobility Support for IPv4", (revised), C. Perkins, Nokia Research Center, pp. 1-92, Jan. 2000.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
```
| Type | Length | reserved |
|---|---|---|
| CFA IP address ||||
| PFA IP address ||||

COMBINATORIAL MOBILE IP SYSTEM AND METHOD OF MANAGING MOBILITY USING THE SAME

BACKGROUND OF THE INVENTION

1. Field of the Invention

The present invention relates to mobile communication systems, and more particularly to a system and method of managing the location and/or movement of mobile IP terminals within a mobile communication system.

2. Background of the Related Art

Mobile IP (Internet Protocol) is a wireless network in which data from one mobile terminal is transmitted/received from a second terminal over a signal path which includes the Internet. Mobility management refers to the process of tracking the location of a mobile IP terminal within a service area. Mobility management is hard to perform on the Internet since the Internet is a distributed system, i.e., depends on the distributed nature of networks and location information is distributed around Internet.

In contrast, the mobility management of cellular networks is easier to perform than on the Internet because cellular networks are centralized systems. In cellular networks, mobility management is performed using two schemes: location updates and paging. On the other hand, conventional Mobile IP uses registration only. This produces further differences. For example, in conventional mobile IP, registration is performed in a manner different from location updates on cellular networks in terms of registration costs. In cellular networks, a centralized top management level such as a mobile switching center (MSC), while conventional Mobile IP is distributed at the leaf nodes such as a home agent (HA) and a foreign agent. This results in a substantial increase in registration costs.

Conventional Mobile IP systems differ from cellular systems in other ways. For example, a home network size in conventional Mobile IP is much smaller than that in cellular networks. Therefore, if the same mobility rate is assumed to exist for conventional Mobile IP and cellular networks, the transition probability from a home network to a foreign network in Mobile IP is higher than that in cellular networks. This may be more clearly understood as follows.

Figure 1:
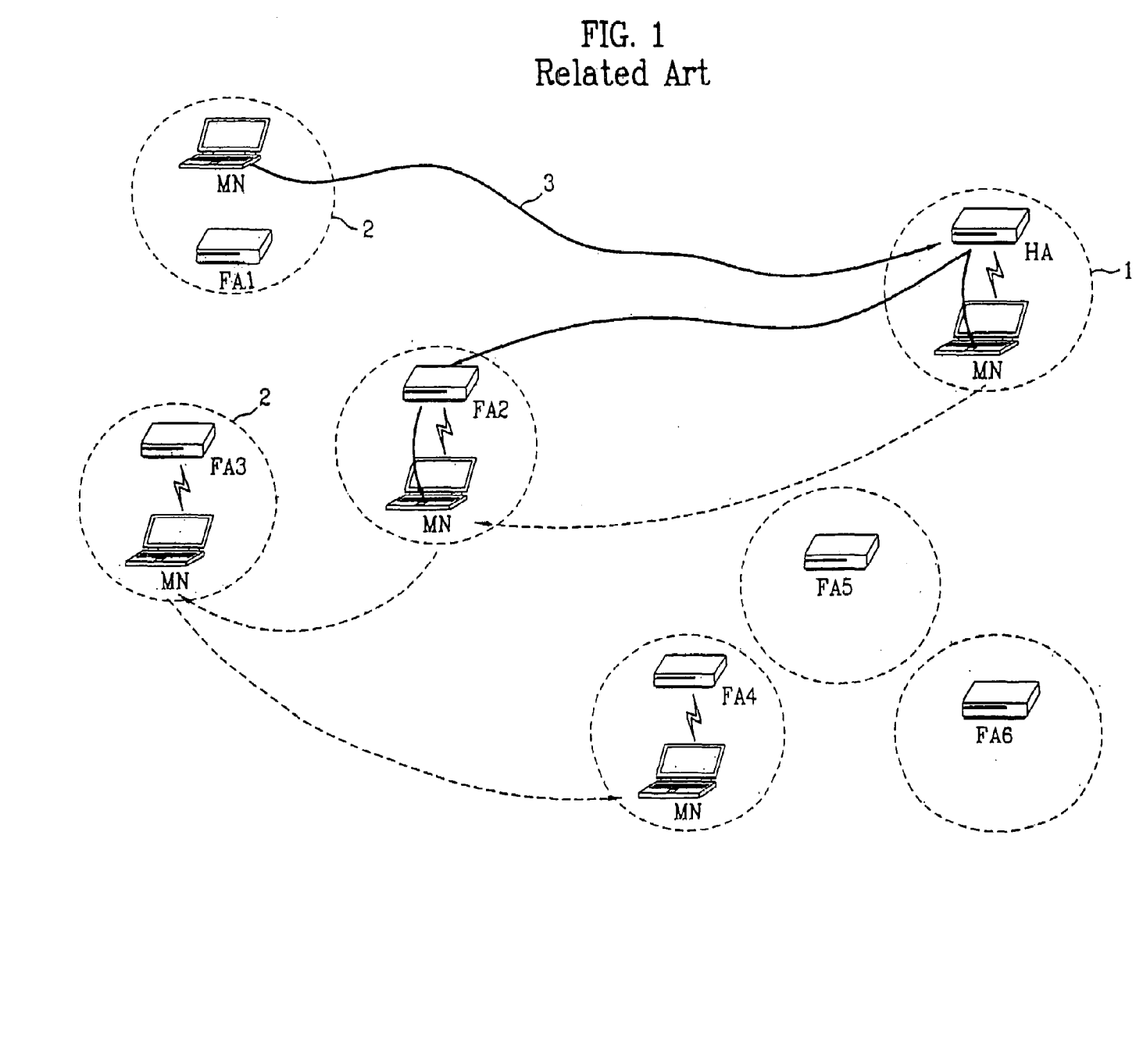
FIG. 1 is a diagram showing an architecture of a conventional system for managing movement of a Mobile IP terminal.

FIG. 1 is a diagram showing an architecture of a conventional system for tracking a location of a mobile IP terminal. The system includes a home network 1 in which a home agent (e.g., server) of the mobile IP terminal is located, and a plurality of foreign networks 2 each having a foreign agent (FA) for managing communications with mobile nodes (MNs) in an associated coverage area.

In this system, when a mobile node moves away from its home network into foreign network FA2, the mobile node registers its location at its foreign agent and then the foreign agent sends information along signal paths to register the location of the mobile node at the home agent of the mobile node. The same is true when the mobile node moves between foreign agents such as from foreign networks FA1 to FA3, or from FA3 to FA4. As a result of this scheme, registration costs in the foreign network may be twice as costly as those in the home network. Moreover, registration costs in Mobile IP increases greatly if the foreign and home agents are distant from each other.

Conventional mobile IP and cellular networks are also different in the way they exchange messages. In conventional mobile IP, a mobile node receives data from a corresponding node via its foreign agent through its home agent when the mobile node moves away from the home network, while the mobile node sends data directly to the corresponding node. Thus, message exchanges are performed asymmetrically on conventional Mobile IP. Yet, in cellular networks, message exchanges are performed symmetrically in that the route to send and receive messages is the same.

In view of the foregoing comparison, it is clear that the efficiency and costs of conventional mobile IP systems have proven to be inferior to those of cellular networks. A need therefore exists for an improved system and method for managing the location and/or movement of IP terminals, and more specifically one which is more efficient to implement in terms of cost and management structure compared with conventional mobile IP systems, and which achieves a performance level approaching or equal to cellular networks when considered in an analogous context.

SUMMARY OF THE INVENTION

An object of the present invention is to provide a combinatorial system and method of managing mobility of IP terminals which achieves improved performance in terms of efficiency and costs compared with conventional mobile IP systems.

Another object of the present invention is to provide a system and method for managing mobility of mobile IP terminals by implementing both a registration and a minimized paging scheme.

Another object of the present invention is to provide a combinatorial system and method for managing the mobility of IP terminals which reduces signaling costs for transmitting and receiving data.

To achieve these and other objects and advantages, the present invention provides, according to one embodiment, a combinatorial Mobile IP system which includes a home agent having a main server for reciprocal communication with a mobile node and a foreign agent relaying reciprocal communication between the mobile and home agent wherein the foreign agent includes at least one regional area constructed with at least one controlling foreign agent communicating with the home agent reciprocally and at least one paging foreign agent communicating reciprocally with the controlling foreign agent.

Preferably, the controlling and paging foreign agents of the regional area construct an upper and lower hierarchical architecture wherein the controlling foreign agent is an upper layer on the paging foreign agent and the paging foreign agent is a lower layer beneath the controlling foreign agent.

Preferably, the paging foreign agent relays reciprocal communication between the mobile node and controlling foreign agent, and the controlling foreign agent relays reciprocal communication between the paging foreign agent and home agent.

Preferably, the regional area is divided into at least one paging area, and the paging area is identified by a paging area identification extension having IP addresses of the controlling and paging foreign agents.

In another aspect of the present invention, in a combinatorial mobile IP system including a home agent having a main server for reciprocal communication with a mobile node and a foreign agent having at least one controlling foreign agent and at least one paging foreign agent to relay reciprocal communication between the mobile and home agent, a method of managing mobility using the combinatorial mobile IP system includes the steps of having the home agent send a data packet to the controlling foreign agent, having the controlling foreign agent request a paging to the paging foreign agent, having the paging foreign agent request a paging to the mobile node, having the mobile node send a paging reply to the paging foreign agent, having the paging foreign agent request a local registration to the controlling foreign agent, having the controlling foreign agent send a local registration reply to the paging foreign agent, and having the paging foreign agent send a paging reply to the controlling foreign agent.

Preferably, in the step of having the controlling foreign agent request the paging to the paging foreign agent, the controlling foreign agent requests the paging to all the paging foreign agents belonging to an area of the controlling foreign agent.

Preferably, in the step of having the paging foreign agent request the paging to the mobile node, the paging foreign agent searches a home address of the mobile node from a visitor list of the paging foreign agent and only the paging foreign agent having the home address of the mobile node sends the paging request to the corresponding mobile node.

In a further aspect of the present invention, a method of managing mobility using a combinatorial mobile IP system includes the steps of having a mobile node move away from a home network to a foreign network or from one area to another area, sending a global registration request from the mobile node to a paging foreign agent, having the paging foreign agent send the global registration request to a controlling foreign agent, having the controlling foreign agent send the global registration request to a home agent, having the home agent send a global registration reply to the controlling foreign agent, having the controlling foreign agent send the global registration reply to the paging foreign agent, and having the paging foreign agent send the global registration reply to the mobile node.

In case that a mobile node moves away from one paging area to another paging area in a same regional area of a foreign agent, a mobile node sends a regional registration request to a paging foreign agent, the paging foreign agent sends the regional registration request to a controlling foreign agent, the controlling foreign agent sends a regional registration reply to the paging foreign agent, and the paging foreign agent sends the regional registration reply to the mobile node.

In this case, the moving mobile node is in active mode. Moreover, in case that a mobile node moves away from one paging area to another paging area, the mobile node sends a local registration request to a paging foreign agent and the paging foreign agent sends a local registration reply to the mobile node. In this case, the moving mobile node is in idle mode. The above-constituted present invention enables to manage mobility in Mobile IP environments effectively, thereby enabling to optimize signaling costs for data transmission and reception.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A combinatorial mobile IP system according to the present invention is configured as follows. First, the system is constructed with a multi-level hierarchical protocol/architecture. In order to reduce complexity, a two-level hierarchy/architecture may be advantageous and thus is described below. Those skilled in the art can appreciate, however, that this two-level embodiment is only provided for illustration purposes and thus should not be considered to be limiting of the invention. For example, if desired, the invention may be constructed with three, four, or even more management levels in order to satisfy the requirements of the specific application.

Second, the system of the present invention performs mobility management using paging and registration, i.e., all foreign agents track the location/movement of Mobile IP terminals using a paging and registration scheme.

Third, the system of the present invention does not put a limitation on cell shapes. More specifically, cell shapes are not assumed to be any particular topology, but rather are randomly structured to be realistic and applicable to real world networks.

Figure 2:
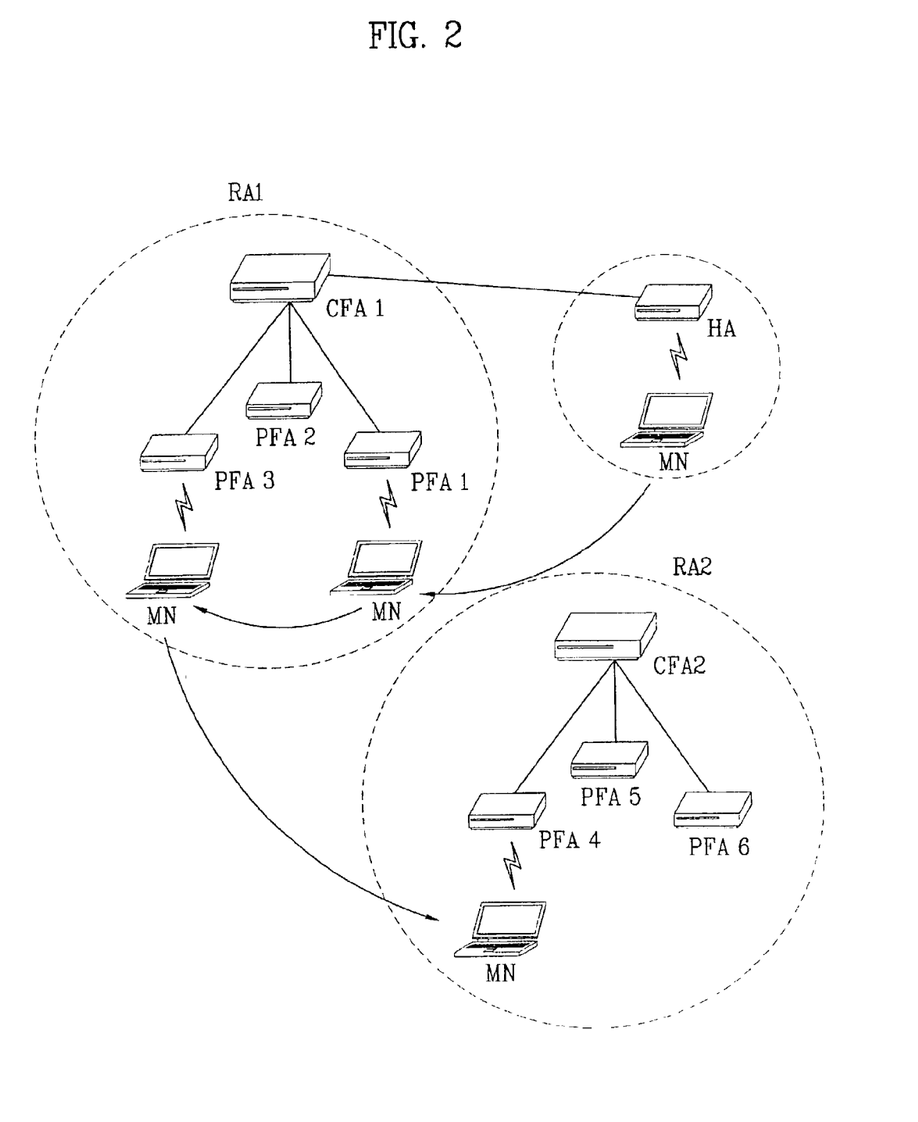
FIG. 2 illustrates schematically an architecture diagram of a combinatorial mobile IP system according to the present invention.

FIG. 2 is a diagram showing an architecture of a combinatorial mobile IP system according to one embodiment of the present invention which incorporates all three features described above. In this system, the mobile IP environments are divided into a home network (HN) 10 and one or more foreign networks (FNs) 20. Within the home network, a home agent (HA) having a main server for performing reciprocal radio communication with a mobile node (MN) exists to manage the home network. A foreign agent (FA) exists in a foreign network and performs the functions of relaying reciprocal radio communication between the mobile node and home agent and managing the foreign network.

Each foreign agent may be divided into at least one upper layer and one lower layer to provide efficient mobility management. The foreign agents manage communications of mobile nodes within respective regional areas RA1 and RA2. Each regional area is constructed with at least one controlling foreign agent (CFA) which radio-communicates with the home agent reciprocally, and at least one paging foreign agent (PFA) which radio-communicates with the controlling foreign agent reciprocally. The controlling foreign agent may be considered an upper layer relative to the paging foreign agent, i.e., the paging foreign agent may reside on a lower layer beneath the controlling foreign agent.

Each paging foreign agent performs functions including relaying a reciprocal radio communication between the mobile node and controlling foreign agent. The controlling foreign agent relays the reciprocal radio communication between the paging foreign agent and home agent.

In this embodiment, the controlling and paging foreign agents in a one regional area (RA1) do not radio-communicate reciprocally with controlling and paging foreign agents in another regional area (RA2). Instead, each paging foreign agent manages a respective paging area (PA) to perform a paging function in a manner similar to a base station (BS) on a cellular network, except the paging foreign agent of the invention performs this function for mobile IP terminals. The controlling foreign agent manages paging functions performed by one or more paging foreign agents in the regional area. The controlling foreign agent therefore performs management functions in a manner similar to a base station controller (BSC) on a cellular network, except that these functions are performed for mobile IP terminals.

A method of managing the location and/or movement of mobile IP terminals in the system of the present invention is explained as follows. Referring again to FIG. 2, if a mobile node is in its home network, the mobile node operates in a manner similar to a conventional mobile IP. However, if the mobile node moves away from its home network, the mobile node must register its location information to a paging foreign agent (PFA) belonging to the area into which the mobile node moves. The paging foreign agent then registers the location information of the mobile node with a controlling foreign agent (CFA). Subsequently, the controlling foreign agent sends the location information of the mobile node to the home agent of the mobile node.

When the mobile node registers its location information with the paging and controlling foreign agents, the paging and controlling foreign agents set a timer if the mobile node is in active mode at a time when the mobile node enters the area of the paging foreign agent. If at the end of the time period the mobile node still has data to send or receive, the active mode timer period will be extended. However, if the mobile node does not send or receive data for a certain period of time, the active timer will expire and the mobile node will revert to idle mode.

Registration of location information of the mobile IP terminal with the controlling foreign agent is conditional. If the mobile node in active mode moves to the foreign agent, the mobile node registers its location information with the paging foreign agent of the corresponding area and the paging foreign agent registers the location information of the mobile node to the controlling foreign agent of the corresponding area. If the mobile node in idle mode moves to the foreign agent, the mobile node registers its location information to the paging foreign agent of the corresponding area only. In this case, the paging foreign agent need not register the location information of the mobile node to the controlling foreign agent of the corresponding area.

Since the mobile node and paging foreign agent are close to each other, registration costs are not considerable. Since registrations are localized, signaling costs for data transmission and reception will not affect the mobile IP system.

If the mobile node moves away from its controlling foreign agent, the mobile node must register at its new controlling foreign agent. This controlling foreign agent then notifies the mobile node's home agent of the mobile node's location information.

When there is some data for the mobile node to receive in idle mode, the controlling foreign agent sends a paging request to its paging foreign agent. The paging foreign agent searches its visitor lists and then broadcasts paging requests to its paging area if a home address of the mobile node is found in the visitor lists. On the other hand, if the paging foreign agent fails to find the home address of the mobile node in the visitor lists, the paging foreign agent assumes that the mobile nodes is not in its paging area and does not send the paging requests to its paging area. Thus, paging in the combinatorial IP system is used for bridging between the controlling foreign agent and the paging foreign agent.

If the controlling foreign agent pages the entire network, paging broadcasts would be overwhelming. If the paging foreign agent registers to its controlling foreign agent whenever it moves, the registration costs would be considerable. Therefore, in order to provide an economical solution, the combinatorial mobile IP system of the present invention is implemented in a way which reduces the amount of paging and registration traffic compared with previous networks, thereby achieving a significant reduction in total signaling costs.

A method of managing mobility of mobile nodes in a combinatorial mobile IP system according to the present invention is explained with reference to FIGS. 3 through 7. First of all, it is noted that the present invention combines paging and registration properly with each other in accordance with mobile IP environments to carry out mobility management. Yet, for the convenience of explanation, the paging and registration will be explained separately in the following.

Paging

Figure 3:
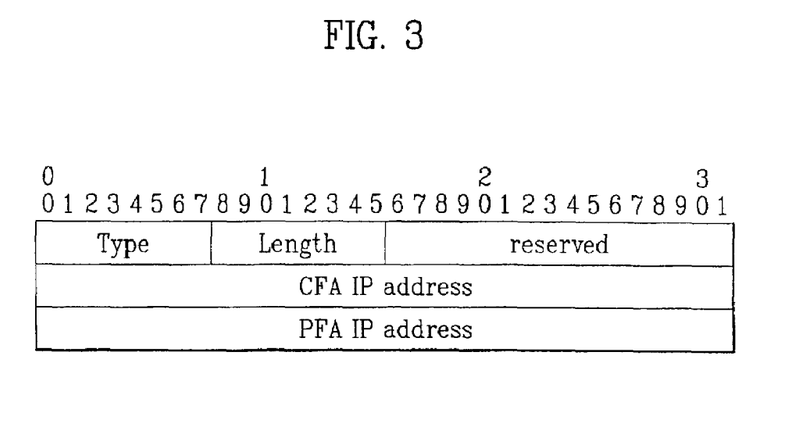
FIG. 3 illustrates a diagram of a paging area identification extension packet according to the present invention.
Figure 4:
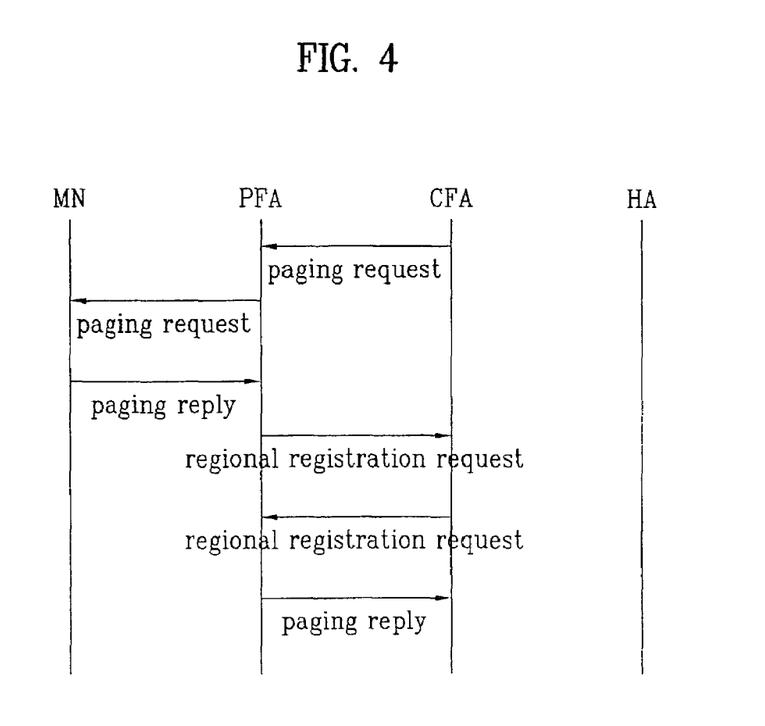
FIG. 4 illustrates a call flow of paging registration according to the present invention.

FIG. 3 is a diagram showing one type of paging area identification extension packet which may be used in accordance with the present invention, and FIG. 4 shows call flow when paging registration is performed by the present invention. A paging area (PA) of the present invention may be identified by IP addresses of its controlling and paging foreign agents. Accordingly, a paging area identification (PAI) packet may include the IP addresses of the controlling and paging foreign agents. The paging area identification may only identify paging areas in a particular regional area. In this case, each of the paging areas is identified by using a small amount of bandwidth.

The paging area identifications may be distributed by agent advertisements together with the paging area identification extension shown in FIG. 3. Therefore, mobile nodes receive the agent advertisements to detect their paging areas.

Referring to FIG. 4, a home agent sends packets, which will be sent to mobile nodes in idle mode, to a controlling foreign agent. Subsequently, the controlling foreign agent sends paging requests to all paging foreign agents in its regional area. However, all the paging foreign agents do not relay the paging requests to their mobile nodes. Instead, before relaying the paging requests to their mobile nodes, the paging foreign agents search their visitor lists to find out the mobile nodes in idle mode. Only the paging foreign agent having the home address of the mobile node sends the paging request to its paging area.

When the mobile node finds its home address in the paging request, the mobile node sends a paging reply to its paging foreign agent. And, the mobile node changes its mode to active mode and starts its active timer.

When the paging foreign agent receives the paging reply from the mobile node, the paging foreign agent sends a regional registration request to its controlling foreign agent. The controlling foreign agent sends the regional registration reply back to its paging foreign agent, and the paging foreign agent sends a paging reply to its controlling foreign agent.

Registration

Figure 5:
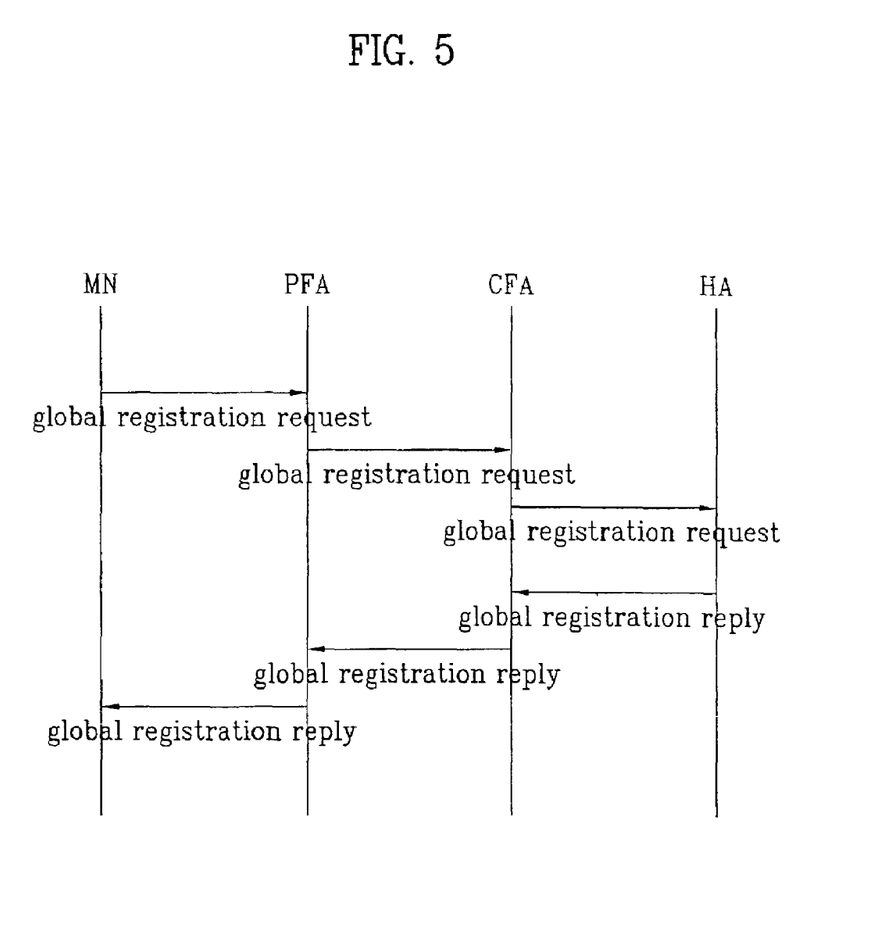
FIG. 5 illustrates a call flow of global registration according to the present invention.

FIG. 5 illustrates a call flow of a global registration operation performed according to the present invention. The registration of mobile IP does not guarantee a signaling delay when the mobile node is remote from the home agent. Besides, the mobile node triggers registration whenever it moves from one foreign agent to another foreign agent. However, the combinatorial mobile IP system according to the present invention controls registration using the controlling foreign agent in a regional area. This results in a significant reduction in registration costs compared with previous mobile IP management systems.

After receiving a reply, the mobile node and foreign agent renew a status of the mobile node by setting the mode of the mobile node to active node and starting the active timer. Moreover, registration requests and replies are involved in registration procedures.

The global registration procedures, as shown in FIG. 5, proceed when a mobile node visits a regional area initially. More specifically, the global registration proceeds when the mobile node moves from a home agent to a foreign agent or from one foreign agent to another foreign agent.

First, the mobile node (MN) sends a global registration request to a paging foreign agent (PFA) in its paging area (PA), and the paging foreign agent sends the global registration request to its controlling foreign agent (CFA).

Subsequently, the controlling foreign agent sends the global registration request to a home agent (HA), and the home agent sends a global registration reply accepting or rejecting the global registration request to the controlling foreign agent.

Then, the controlling foreign agent sends the global registration reply to the paging foreign agent, and the paging foreign agent relays to the mobile node to acknowledge the result of the global registration reply.

Figure 6:
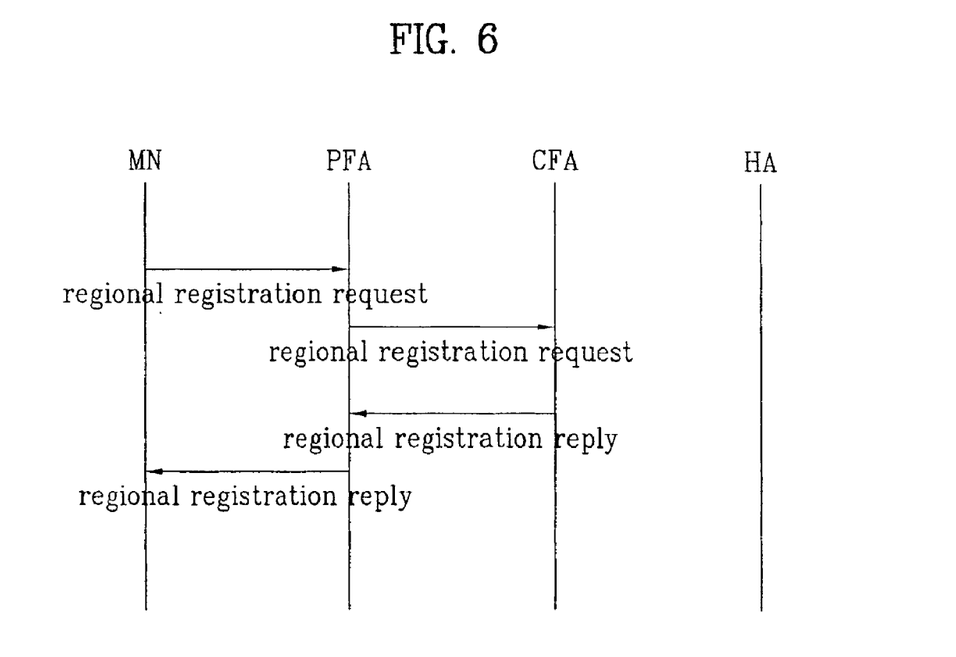
FIG. 6 illustrates a call flow of regional registration according to the present invention.

FIG. 6 illustrates a call flow of regional registration according to the present invention. The regional registration procedures are performed when a mobile node in active mode moves away from one paging area to another paging area without changing its regional area.

First, the mobile node sends a regional registration request to a paging foreign agent in its regional area, and the paging foreign agent relays the regional registration request to its controlling foreign agent. Subsequently, the controlling foreign agent sends a regional registration reply to the paging foreign agent, and then the paging foreign agent relays the regional registration reply to the mobile node.

Figure 7:
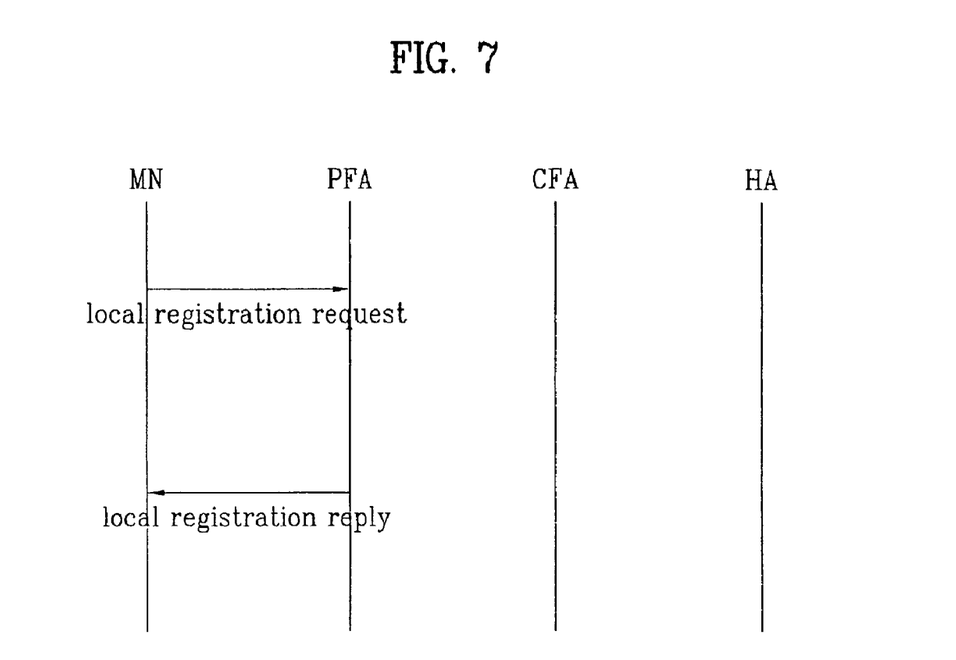
FIG. 7 illustrates a call flow of local registration according to the present invention.

FIG. 7 illustrates a call flow of local registration according to the present invention. The local registration procedures are performed when a mobile node in idle mode moves away from one paging area to another paging area in a specific regional area. First, the mobile node sends a local registration request to a paging foreign agent in its paging area, and the paging foreign agent sends a local registration reply to the mobile node. Thus, when the mobile node in idle mode moves between paging areas, the registration procedures are simplified since the mobile node registers at its paging foreign agent only.

In the combinatorial mobile IP system according to the present invention, registration procedures are therefore performed in the following cases.

First, a local registration procedure is performed when an idle mobile node moves to a new paging area (PA) in the same regional area (RA).

Second, a regional registration procedure is performed when an active mobile node moves to a new paging area in the same regional area (RA).

Third, a global registration procedure is performed when a mobile node moves to a new regional area (RA).

Fourth, registration is performed when a lifetime of a mobile node expires.

Fifth, registration is performed with a paging or controlling foreign agent (PFA or CFA) of a mobile node is rebooted.

Sixth, regional registration is performed when a mobile node is paged.

Seventh, registration is performed when an idle mobile node is about to transmit data.

Figure 8:
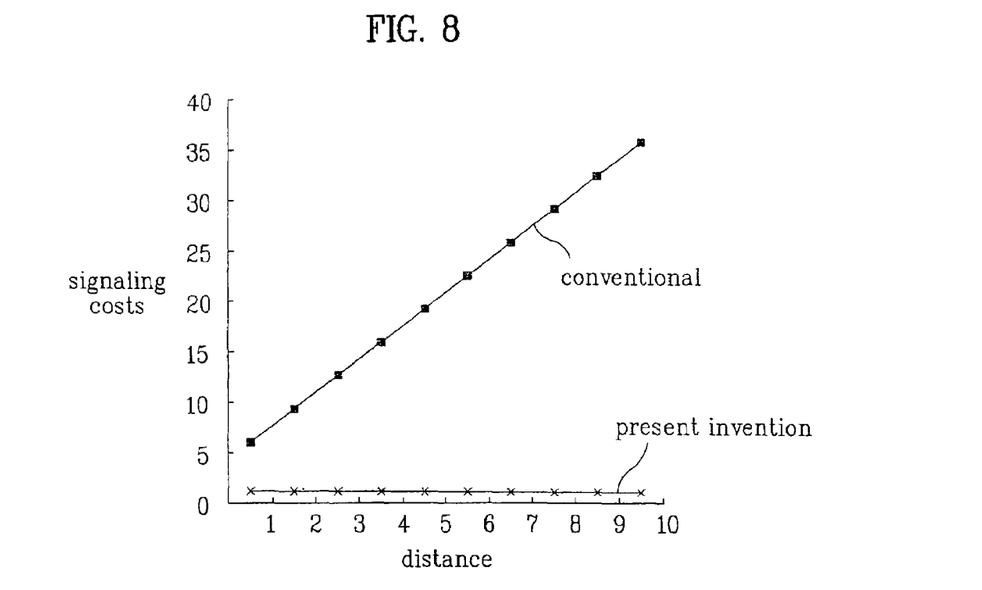
FIG. 8 illustrates a comparison graph between the present invention and related art for total signaling costs according to the distance between home and foreign agents.

FIG. 8 is a graph comparing total signaling costs for the present invention and conventional systems based on the distance between home and foreign agents. Generally, in conventional mobile IP, total signaling costs are affected as a mobile node travels further away from its home agent. More specifically, as shown by the curve, signaling costs in conventional mobile IP systems increase linearly as the distance between the home agent and foreign agent increases.

In contrast, the mobile IP location managing system of the present invention separates global registration and regional registration from each other. As a result, registration costs do not propagate to the home agent while a mobile node is in the same regional area. Hence, the signaling costs of the present invention remain constant and low in the same regional area. Therefore, the benefits of the present invention result from the separation of local and regional registrations and the use of paging.

Figure 9:
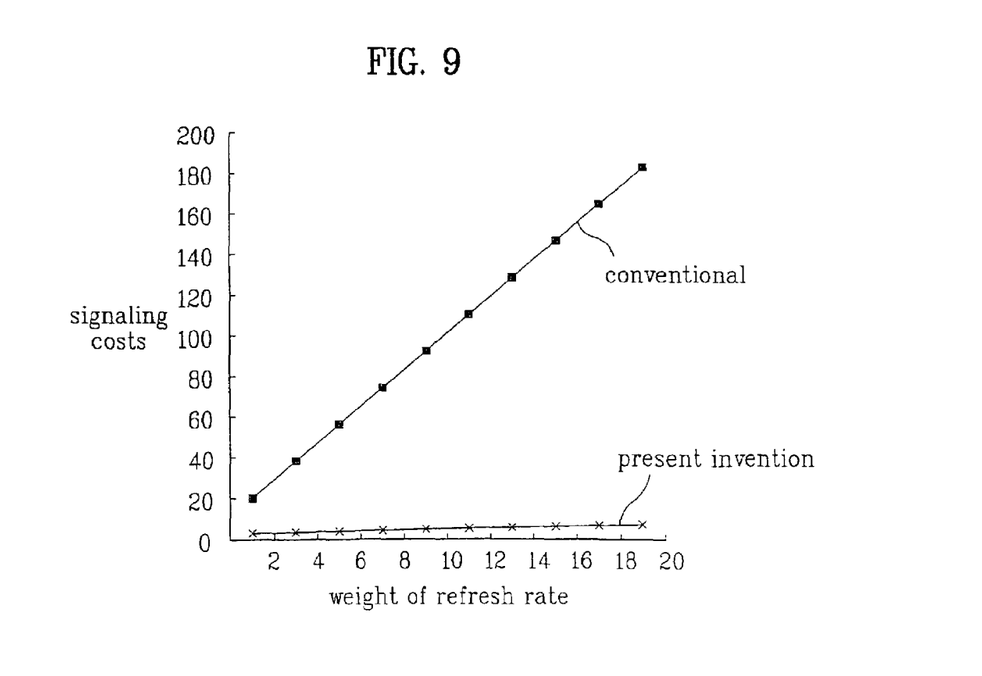
FIG. 9 illustrates a comparison graph between the present invention and related art for total signaling costs according to the weight of the refresh rate of local registration.

FIG. 9 is a graph comparing the present invention and conventional systems in terms of the total signaling costs realized for the weight of the refresh rate of local registration. In conventional mobile IP systems, signaling costs are substantially affected by the increment of a refresh rate of local registration. However, the mobile IP system according to the present invention, as shown in FIG. 9, achieves a much more constant and lower cost than the conventional mobile IP system. Such an advantage results from making use of the separation of the mobile node into active and idle modes.

Figure 10:
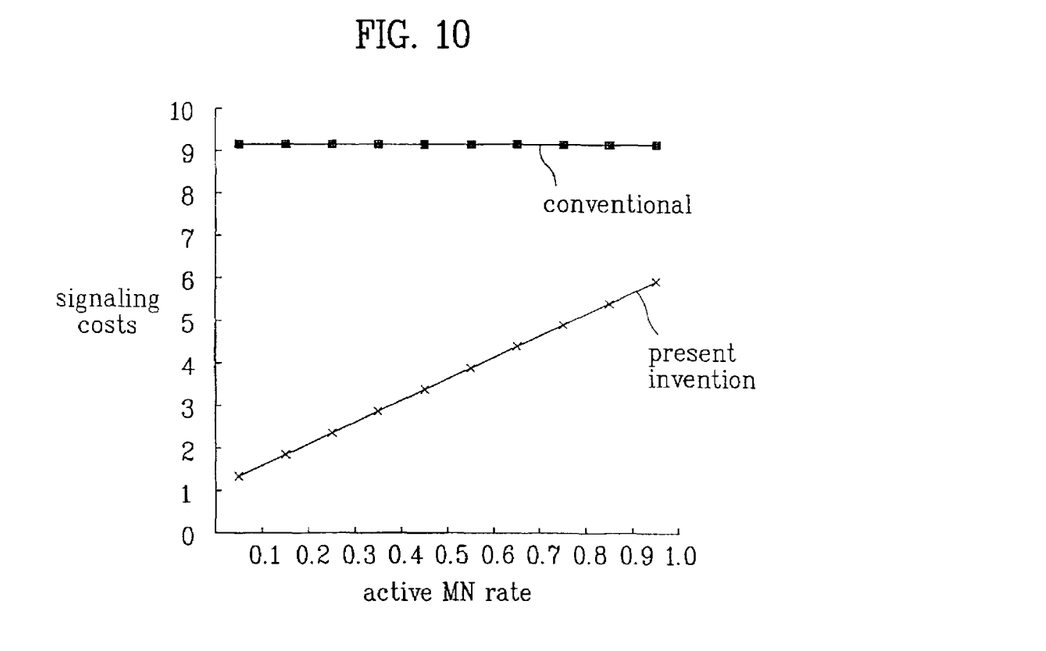
FIG. 10 illustrates a comparison graph between the present invention and related art for total signaling costs according to a ratio increment of an active mobile node.

FIG. 10 is a graph comparing the total signaling costs achieved by the present invention and conventional system for a ratio increment of an active mobile node. The present invention advantageously divides a mode status into active and idle modes of use, thereby reducing total signaling costs compared with conventional systems which do not differentiate their modes.

Figure 11:
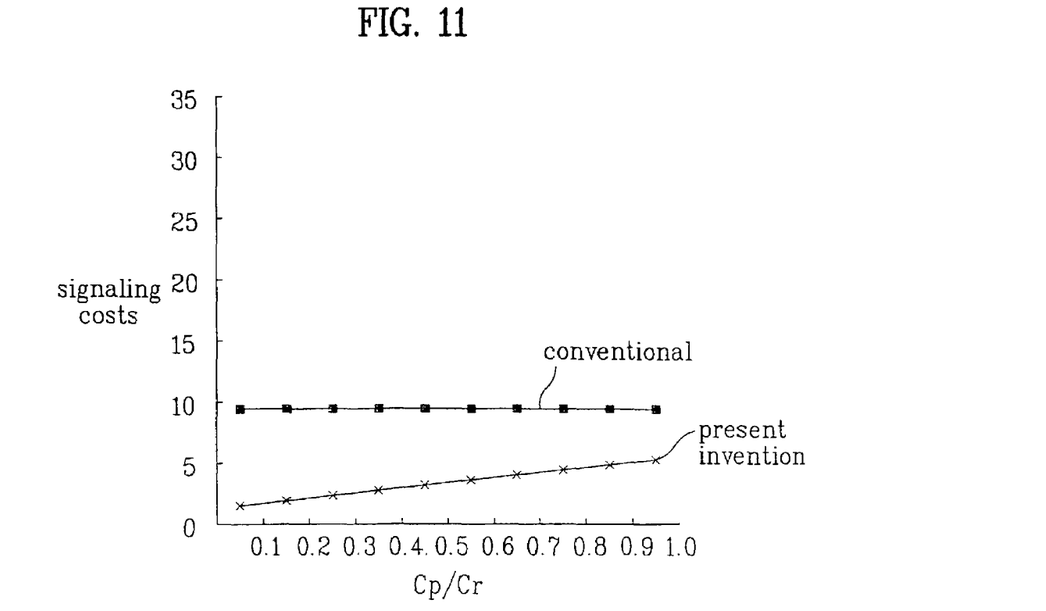
FIG. 11 illustrates a comparison graph between the present invention and related art for total signaling costs according to the rate of paging costs (Cp)/registration costs (Cr).

FIG. 11 is a graph comparing total signaling costs realized by the present invention and conventional systems for the rate of paging costs (Cp)/registration costs (Cr). As shown, the present invention reduces total signaling costs according to the rate of paging costs (Cp)/registration costs (Cr) much more than conventional mobile IP systems.

In summary, the combinatorial system and method of the present invention manages mobility of IP terminals efficiently using both registration and minimized paging. As a result, the invention is suitable not only for macro- but also micro-mobility applications, and also for managing terminals when operating in idle mode as well as active mode. By taking this approach, signaling costs for data transmission and reception may be significantly improved compared with conventional mobile IP systems.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for managing a mobile IP system, comprising:
a controlling foreign agent in communication with a home agent of a mobile IP terminal; and
a first paging foreign agent which is in communication with the controlling foreign agent and which registers location information of the mobile IP terminal when the mobile IP terminal moves into a first paging area of a service region managed by the controlling foreign agent, wherein the first paging foreign agent registers the location information of the mobile IP terminal with the controlling foreign agent on condition that the mobile IP terminal is in active mode at a time when the mobile IP terminal moves into the first paging area, said active mode corresponding to a state where the mobile IP terminal is sending data to or receiving data from an IP network.

2. The system of claim 1, wherein the first paging foreign agent transmits a paging signal to the mobile IP terminal for changing the mobile IP terminal from idle mode to said active mode.

3. The system of claim 1, further comprising:
a second paging foreign agent which is in communication with the controlling foreign agent and which registers location information of the mobile IP terminal in a second paging area in said service region.

4. The system of claim 1, wherein the location information of the mobile IP terminal is not registered with the home agent when the mobile IP terminal is idle mode at said time, said idle mode corresponding to a state when the mobile IP terminal is not sending user data to or receiving user data from said network.

5. The system of claim 1, wherein the first paging foreign agent transmits the location information to the controlling foreign agent when the mobile IP terminal is in said active mode, and does not transmit the location information to the controlling foreign agent if the mobile IP terminal is in idle mode, said idle mode corresponding to a state when the mobile IP terminal is not sending data to or receiving data from said network.

6. The system of claim 1, wherein the controlling foreign agent manages paging functions performed by the first paging foreign agent.

7. The system of claim 1, wherein the location information of the mobile IP terminal is not registered with the home agent if the mobile IP terminal is in idle mode, said idle mode corresponding to a state where the mobile IP terminal is not sending data to or receiving data from said IP network.

8. The system of claim 1, wherein the first paging foreign agent does not register the location information of the mobile IP terminal with the controlling foreign agent if the mobile IP terminal is in idle mode when the mobile IP terminal moves into the first paging area, said idle mode corresponding to a state where the mobile IP terminal is not sending data to or receiving data from said IP network.

9. The system of claim 1, wherein the controlling foreign agent sends a paging signal to the first paging foreign agent when data is to be transmitted to the mobile IP terminal in idle mode, and wherein the first paging foreign agent conditionally broadcasts a paging request in the first paging area, said idle mode corresponding to a state where the mobile IP terminal is not sending data to or receiving data from said IP network.

10. The system of claim 9, wherein the foreign agent does not broadcast a paging request in the first paging area when the first paging foreign agent fails to find a home address of the mobile IP terminal in a visitor list.

11. A method for managing movement of a mobile IP terminal in a communications system, said system including a first agent which manages communications in a first service region and a second agent which manages communications in a second service region, the mobile IP terminal having a home IP address in the first service region, said method comprising:
detecting that the mobile IP terminal has entered a first paging area in the second service region;
registering information indicative of a location of the mobile IP terminal with a paging agent that manages communications in the first paging area; and
conditionally transmitting said location information from the paging agent to the second agent, wherein said location information is transmitted to the second agent on condition that the mobile IP terminal is in active mode at a time when the mobile IP terminal enters the first paging area, said active mode corresponding to a state where the mobile IP terminal is sending data to or receiving data from an IP network.

12. The method of claim 11, further comprising:
transmitting said location information from the second agent to the first agent.

13. The method of claim 11, further comprising:
detecting that the mobile IP terminal has entered a new location corresponding to a second paging area in the second service region; and
registering the new location information with a paging agent that manages communications in the second paging area.

14. The method of claim 13, further comprising:
conditionally transmitting the new location information to the second agent
wherein the new location information is transmitted to the second agent on condition that the mobile IP terminal is in said active mode at the time the mobile IP terminal enters the second paging area.

15. The method of claim 14, further comprising:
withholding transmission of the new location information to the second agent if the mobile IP terminal is in idle mode at the time when the mobile IP terminal enters the second paging area, said idle mode corresponding to a state where the mobile IP terminal is not sending data to or receiving data from said IP network.

16. The method of claim 11, further comprising:
transmitting information from the paging agent to the mobile IP terminal, said information including an IP address of the paging agent and an IP address of the second agent.

17. The method of claim 16, further comprising:
routing packet information from the mobile IP terminal to the first agent based on the IP address of the paging agent and the IP address of the second agent.

18. The method of claim 11, wherein said registering and transmitting are performed when at least one of the paging agent and the second agent are re-booted.

19. The method of claim 11, wherein at least the registering step is performed when a lifetime of the mobile IP terminal expires.

20. A method for managing movement of a mobile IP terminal in a communications system, said system including a first agent which manages communications in a first service region and a second agent which manages communications in a second service region, the mobile IP terminal having a home IP address registered in the first service region, said method comprising:
 (a) detecting that the mobile IP terminal has entered one of a plurality of paging areas in the second service region, said plurality of paging areas managed by a plurality of paging agents respectively;
 (b) broadcasting a paging request to said plurality of paging agents;
 (c) determining whether an address of the mobile IP terminal is registered in any one of the paging agents; and
 (d) transmitting said paging request to the mobile IP terminal, said paging request being transmitted from the paging agent which has registered the mobile IP terminal, wherein (b)–(d) are performed on condition that the mobile IP terminal is in idle modes, said idle mode corresponding to a state where the mobile IP terminal is not sending data to or receiving data from an IP network.

21. The method of claim 20, further comprising:
 switching the mobile IP terminal from said idle mode to active mode when the mobile IP terminal receives the paging request transmitted in step (d), said active mode corresponding to a state where the mobile IP terminal sends data to or receives data from said IP network.

22. The method of claim 21, further comprising:
 transmitting data from the first agent to the mobile IP terminal through the second agent and the paging agent which transmitted the paging request.

23. A system for managing movement of a mobile IP terminal, comprising:
 a first agent which manages communications in a first service region; and
 a second agent which transmits paging signals to a first paging area in the first service region, said second agent registering information indicative of a location of the mobile IP terminal located in the first paging area and transmitting the location information to the first agent on condition that the mobile IP terminal is in active mode in the first paging area, said mobile IP terminal having a home address registered with an agent which manages communications in a second service region and wherein said active mode corresponds to a state where the mobile IP terminal is sending data to or receiving data from an IP network.

24. The system of claim 23, wherein the first agent transmits the location information to the agent which manages communications in the second service region.

25. The system of claim 23, further comprising:
 a third agent which transmits paging signals in a second paging area in the first service region, wherein when the mobile IP terminal moves from the first paging area to the second paging area, the third agent registers the mobile IP terminal in the second paging area.

26. The system of claim 25, wherein the third agent transmits information indicative of the registration of the mobile IP terminal in the second paging area to the first agent on condition that the mobile IP terminal is in said active mode at a time when the IP terminal enters the second paging area.

27. The system of claim 25, wherein the third agent transmits said information to the first agent if the mobile IP terminal is in said active mode at the time the mobile IP terminal enters the second paging area.

28. The system of claim 25, wherein the third agent does not transmit said information to the first agent if the mobile IP terminal is in idle mode at the time when the mobile IP terminal enters the second paging area, said idle mode corresponding to a state where the mobile IP terminal is not sending data to or receiving data from said IP network.

29. The system of claim 23, wherein the second agent transmits information including an IP address of the second agent and an IP address of the first agent to the mobile IP terminal.

30. The system of claim 29, wherein the mobile IP terminal transmits packet information to the agent managing communications in the second service region based on the IP address of the first agent and the IP address of the second agent.

* * * * *